US012742088B2

(12) United States Patent
Aeby et al.

(10) Patent No.: US 12,742,088 B2
(45) Date of Patent: Sep. 22, 2026

(54) SHEAR-THINNING GEL COMPOSITIONS FOR PREPARING ELECTRONICALLY CONDUCTIVE INKS

(71) Applicant: EMPA EIDGENOSSISCHE MATERIALPRUFUNGS- UND FORSCHUNGSANSTALT, Dubendorf (CH)

(72) Inventors: Xavier Aeby, Valeyres-sous-Montagny (CH); Gustav Nystrom, Windisch (CH); Alexandre Poulin, Neuchatel (CH); Gilberto Siqueira, Gockhausen (CH)

(73) Assignee: EMPA EIDGENOSSISCHE MATERIALPRUFUNGS- UND FORSCHUNGSANSTALT, Dubendorf (CH)

( * ) Notice: Subject to any disclaimer, the term of this patent is extended or adjusted under 35 U.S.C. 154(b) by 375 days.

(21) Appl. No.: 18/261,436

(22) PCT Filed: Jan. 14, 2022

(86) PCT No.: PCT/EP2022/050716
§ 371 (c)(1),
(2) Date: Jul. 13, 2023

(87) PCT Pub. No.: WO2022/152830
PCT Pub. Date: Jul. 21, 2022

(65) Prior Publication Data

US 2024/0067839 A1 Feb. 29, 2024

(30) Foreign Application Priority Data

Jan. 14, 2021 (EP) .................................... 21151491

(51) Int. Cl.
*C09D 11/52* (2014.01)

(52) U.S. Cl.
CPC .................................. *C09D 11/52* (2013.01)

(58) Field of Classification Search
CPC .................................................... C09D 11/52
See application file for complete search history.

(56) References Cited

U.S. PATENT DOCUMENTS

2018/0190998 A1* 7/2018 Maeda ............... H01M 8/0245
2020/0002560 A1 1/2020 Lai

OTHER PUBLICATIONS

International Search Report and Written Opinion for PCT/EP2022/050716 dated Mar. 23, 2022.

(Continued)

*Primary Examiner* — William D Young
(74) *Attorney, Agent, or Firm* — Bryan D. Zerhusen; Nicholas R. Herrel; CANTOR COLBURN LLP

(57) ABSTRACT

The present invention is directed to a shear-thinning gel composition for producing a dry, water-stable and electronically conductive ink, comprising (a) dispersed electrically conductive graphite flake particles and (b) at least one further type of electronically conductive particles selected from carbon black and conductive pyrolyzed plant carbon components in a specific ratio of (a) to (b) as well as (c) a dissolved binder based on or consisting of shellac dissolved in a suitable solvent, where-in the ratio of the total of the electrically conductive particles (a)+(b) and the dissolved binder (c) and the weight proportion of the electrically conductive particles in the composition are specified. The invention further relates to the dried and electronically conductive inks, methods for producing the gel compositions and the use of these gel compositions for preparing, optionally ink-jet printing or robocasting 2D or 3D print products, in particular for preparing electronic devices, such as, for example, flexible electronic devices, biosensors, logic and memory devices, supercapacitors, batteries, flexible (Continued)

Shear thinning, humidity stable and electrically conductive gel
for robocasting of electronics applications batteries, capacitive sensors, RFID tags, and smart packaging.

11 Claims, 10 Drawing Sheets

(56) References Cited

OTHER PUBLICATIONS

Jakus AE, Three-dimensional printing of high-content graphene scaffolds for electronic and biomedical applications. ACS Nano. 2015;9(4):4636-48. doi: 10.1021/acsnano.5b01179. Epub Apr. 20, 2015. PMID: 25858670.

* cited by examiner

Shear thinning, humidity stable and electrically conductive gel for robocasting of electronics applications FIG. 9A
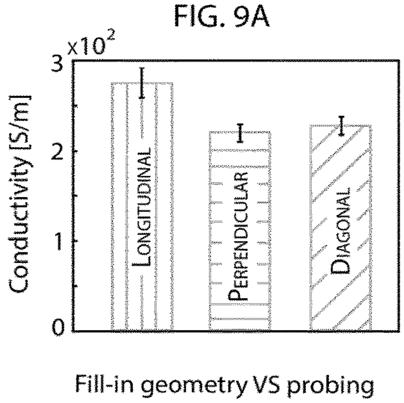
FIG. 9B
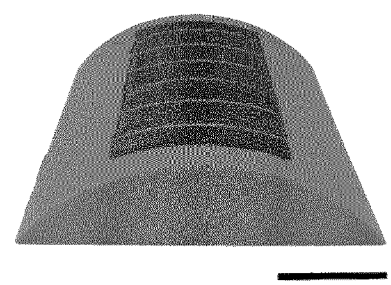
FIG. 9C
FIG. 9D
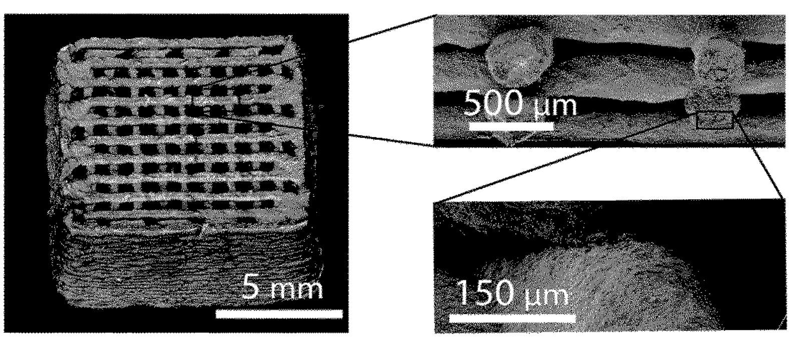
FIG. 9E
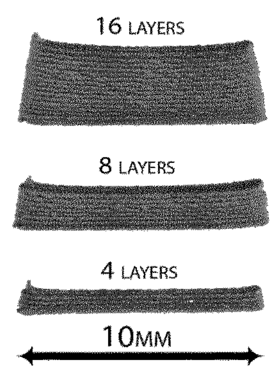

SHEAR-THINNING GEL COMPOSITIONS FOR PREPARING ELECTRONICALLY CONDUCTIVE INKS

The present invention is directed to a shear-thinning gel composition for producing a dry, water-stable and electronically conductive ink, comprising (a) dispersed electrically conductive graphite flake particles and (b) at least one further type of electronically conductive particles selected from carbon black and conductive pyrolyzed plant carbon components in a specific ratio of (a) to (b), as well as (c) a dissolved binder based on or consisting of shellac dissolved in a suitable solvent, wherein the ratio of the total of the electrically conductive particles (a)+(b) and the dissolved binder (c), and the weight proportion of the electrically conductive particles in the composition are specified.

The invention further relates to the dried and electronically conductive inks, methods for producing the gel compositions and the use of these gel compositions for preparing, optionally ink-jet printing or robocasting 2D or 3D print products, in particular for preparing electronic devices, such as, for example, flexible electronic devices, biosensors, logic and memory devices, supercapacitors, batteries, flexible batteries, capacitive sensors, RFID tags, and smart packaging.

The development of internet-of-things (IoT) electronics for applications such as wearable technologies and smart packaging leads to a massive increase of low cost electronic products with short lifespan and an exponentially growing amount of electronic waste. Recycling this new class of electronics is particularly challenging due to the wide variety of components and their low economic value.

Disposable electronics are attractive in this field. The development of new materials and new manufacturing techniques is of crucial importance for this new era of electronics. Thus far, the range of available materials and manufacturing processes for disposable electronics is limited. Metals such as e.g. zinc, magnesium and iron have been used as biodegradable electrical conductors, electrodes or current collectors for electronics. The processing of these metals requires expensive and time-consuming cleanroom processes such as e.g. sputtering, photolithography and reactive ion etching or post-processing such as photo curing steps or chemical sintering. These standard microelectronic manufacturing processes suffer from geometrical limitations (due to the planar stacking technology) and limited manufacturing areas (due to the use of vacuum chambers). Carbon-based materials can provide a cleanroom-free alternative for developing electrodes and current collectors but compared to metals they are lower in electrical conductivity. Electrically conductive carbon-polymer composites can be processed with alternative manufacturing techniques, such as e.g. screen-printing, gravure printing, inkjet-printing or, marginally, 3D printing. Screen-printing, gravure printing and inkjet-printing are roll-to-roll compatible and ideally suited to manufacturing low-cost, single-use or disposable electronics on flexible substrate such as e.g. paper, polyimide or PET. 3D printing enables the integration of active components with structural components in a single manufacturing procedure.

Jakus et al. (ACS Nano, 9:4, 4636-4648, 2015) discloses the use of graphene, a component for use in electronics, optoelectronics, energy storage and structural composites, in 3D liquid ink printable graphene (3DG) composites consisting mainly of graphene and to a minor part of polylactide-co-glycolide, a biocompatible elastomer. The resulting 3DG material is robust, flexible and displays electrical conductivities greater than 800 S/m. In vitro the 3DG material supports adhesion, viability, proliferation and differentiation of human mesenchymal stem cells and biocompatibility in vivo.

Apart from the manufacturing, the water stability of biodegradable electronics is a recurring issue and, to date, impedes a large-scale establishment of cheap and disposable electronics. Water permeability accelerates disintegration, which ultimately leads to biodegradation. However, the oxidation and dissolution of transient metals in water occurs quickly and are detrimental to electronics functionalities. Water-soluble biodegradable polymers such as e.g. cellulose, carboxymethyl cellulose, hydroxypropyl cellulose or polyvinyl alcohol, and water permeable polymers such as e.g. polylactic acid, poly lactic-glycolic acid, polyglycolic acid or polycaprolactone have low water-uptake rates and solubility but still require encapsulation to increase the shelf-life of devices before electronic functionalities failure.

Power supply is the cornerstone of disposable electronics. Thus far, they still require batch-fabricated batteries e.g. lithium-ion or alkaline batteries. These comprise toxic materials with predefined specifications and geometries, thus limiting their disposability and integration. Alternatively, RFID antennas or energy harvesting devices such as tribo-electric, thermoelectric and piezoelectric generators can be made from biodegradable materials but the power generation remains highly dependent on the operating environment. This drawback can be circumvented by coupling the harvester to an energy storage module undergoing multiple charge and discharge cycles at various rates and capable of accumulating and releasing the harvested energy when needed. Supercapacitors are ideally suited as energy storage module for biodegradable harvesters for low cost disposable (IoT) electronics.

Supercapacitors and specifically electrical-double-layer-capacitors (EDLC) are known for their long cycle life, high power density, high capacitance and fast charging rate. Their maximum operating voltage is limited with aqueous electrolytes to 1.2 V and higher voltage can be achieved by connecting several of them in series. EDLC are composed of two electrodes separated by an electrolyte solution. Charges of opposite polarity accumulate at the electrode-electrolyte interface separated by a monolayer of solvent molecules. The small dimension of this molecular gap enables higher capacitance than standard dielectric capacitors. Without charge transfer between electrode and electrolyte EDLC are strictly electrostatic and they can be prepared from biodegradable and edible materials rendering these capacitators disposable and eco-friendly.

Carbon-based materials used as electrodes and current collectors in supercapacitors have been reported to have a specific capacitance maximum value of 30 F $g^{-1}$ for all-carbon EDLC when combined with a non-toxic electrolyte. The different components of EDLCs are typically challenging to integrate in a single manufacturing technique. In fact, most of the state-of-the-art printed EDLCs require post processing or assembly. The only reported fully printed EDLCs are based on toxic electrolyte and non-disposable materials with a maximum capacitance of 2 F $g^{-1}$.

Robocasting is a direct ink writing (DIW) technique for producing 3D printed structures in the mm to cm scale with high-aspect ratio and spanning features. The presently available techniques can be classified as filament-based, e.g. robocasting, solvent-casting, fused deposition and micropen writing, or as droplet-based, e.g. inkjet, binder jet and hot-melt printing. Robocasting is compatible with a wide range of materials and prints viscous and high solid content inks, typically by mechanical or pneumatic extrusion through a printing nozzle. For shape fidelity the extruded filament must maintain its shape once printed. This is achieved with shear-thinning gel-inks that exhibit liquid-like behaviour in the nozzle, i.e. under external shear stress, and gel-like behavior with enough elasticity to prevent flow and deformation of the printed material when shearing ceases.

Robocasting differs from solvent-casting, a different DIW technique for which shape retention of the printed filament is ensured by rapid solvent evaporation rather than the ink's rheology. For robocasting a wide range of materials have been printed including metals, polymers, graphene and biomaterials, allowing for the creation of structures with specific functional properties such as biocompatibility, ferroelectricity, enhanced catalytic activity and high electrical conductivity. Robocasting inks typically include a combination of binders, solvents, and additives to achieve the required rheology and confer the desired physical properties. Electrically conductive inks based on different types of metal and carbon particles have been reported. Binders for robocasting inks include synthetic polymers such as epoxy, polyurethane, poly(acrylic acid), polyvinylidene fluoride and pluronic; bio-based polymers such as nanocellulose and carboxymethylcellulose; as well as inorganic materials such as graphene oxide and ceramics. Combinations of solvents can also be used to develop binder-free inks but are typically poorly adapted to printing 3D structures due to the drastic shrinkage experienced upon drying.

It is the objective of the present invention to provide new and improved shear-thinning gels, in particular gels that are essentially non-toxic, environmentally safe, cost-efficient and electronically conductive for utility in 2D and 3D DIW techniques, in particular, in filament-based techniques such as robocasting. Furthermore, it is an objective to provide such improved gel compositions for manufacturing electronic devices, optionally fully 3D-printed electronic devices, such as for example, flexible electronic devices, biosensors, logic and memory devices, batteries, flexible batteries, capacitive sensors, RFID tags, supercapacitors and smart packaging.

In a first aspect, the present invention is directed to a shear-thinning gel composition for producing a dry, water-stable and electronically conductive ink, comprising:

(i) dispersed electrically conductive particles comprising
  (i.1) graphite flakes and
  (i.2) at least one further type of electronically conductive particles selected from the group consisting of carbon black and conductive pyrolyzed plant carbon components, optionally pyrolyzed cellulose or lignin, in a ratio (i.1) to (i.2) of about 8 to 1 to about 1 to 4, optionally about 6 to 1 to about 1 to 2, optionally about 4 to 1 parts by weight graphite flakes (i.1) to the further carbon component(s) (i.2);

(ii) a dissolved binder based on or consisting of shellac dissolved in at least one solvent having a vapor pressure between 1 Pa and 6 kPa, optionally between 200 Pa and 3 kPa, optionally between 200 Pa and 1000 Pa, optionally about 200 Pa;

wherein
  the electrically conductive particles of (i) and the dissolved binder of (ii) are present in a ratio (i) to (ii) of about 0.1 to 2, optionally about 0.25 to 1.2, optionally about 0.5 by weight particles (i) to dissolved binder (ii);
  the solid content of the composition is optionally about 10 to 80, optionally about 30 to 70, optionally about 58.5 parts by weight; and
  the electrically conductive particles are about 5 to 60, optionally about 10 to 40, optionally about 33 parts by weight of the composition.

It was surprisingly found that a composition comprising specific ratios of (i) dispersed electronically conductive graphite flakes combined with dispersed electrically conductive particles of carbon black and/or conductive pyrolized plant carbon components, and (ii) suitably dissolved binders based on or consisting of shellac have utility as shear-thinning gel composition for producing improved dry, water-stable and electronically conductive inks.

These gel ink compositions are improved over previous gel ink compositions because the resulting printed and vaporized products are economical, non-toxic and environmentally non-hazardous due to the electronically conductive carbon components and the natural shellac or shellac-based binder, and feature high electronic conductivity, excellent printability and do not produce cracks after evaporation of solvent(s).

For example, the gel compositions will enable shape retention when 3D printed, e.g. by robocasting, display high electrical conductivity of >200 S/m, offer metal-free, non-toxic and sustainable alternatives to metal-based electrodes, are water stable when printed and dried, thus enabling a humidity-stable electrical performance and feature a sustainable bio-sourced and biodegradable shellac or shellac-based binder that is soluble in suitable low-toxicity solvents.

As demonstrated experimentally, the gel compositions of the present invention can, for example, be used to manufacture fully printed supercapacitors having ten times higher specific capacitance than those previously reported for printed gel compositions of the state of the art.

The term shear-thinning gel composition as used herein is understood as common in the art, i.e. as a non-Newtonian fluid composition in gel form, e.g. a shear-thinning gel that becomes less viscous with increased strain, e.g. when shaken, agitated, sheared or otherwise shear-stressed.

The shear-thinning compositions for use in the present invention optionally retain their printed shape and do not flow. In other words, the yield stress of the inks can be adapted as needed for the specific application.

The dispersed electrically conductive particles comprise (i) graphite flakes, also called crystalline small graphite flakes, a non-toxic, naturally occurring type of graphite mineral consisting of carbon and typically in the form of isolated, flat, plate-like particles with either hexagonal or angular edges if unbroken or with broken irregular or angular edges. It is regularly found in metamorphic rocks such as limestone, gneiss and schist. It has numerous applications, for example, in the auto industry, and it is the type of graphite required for anodes of lithium-ion batteries used in electric vehicles. Graphite flakes are flat and plate-like and their dimensions are given with (maximum) length and thickness. The flakes dimensioned for use in the present invention establish conductivity and contribute to the film integrity of the gel composition.

In one embodiment for the gel composition of the present invention the electrically conductive graphite flakes have a length of 1 to 100 μm, optionally 1 to 20 μm, optionally about 7 μm, and/or a thickness of 20 to 250 nm, optionally 150 to 250, optionally of about 200 nm.

The further type of electronically conductive particles (i.2) is carbon black and/or conductive pyrolyzed plant carbon components, optionally pyrolyzed cellulose or lignin.

Carbon black and its subtypes such as but not limited to acetylene black, channel black, furnace black, lamp black and thermal black is a material produced by the incomplete combustion of petroleum products such as but not limited to FCC tar, coal tar, ethylene cracking tar or plant carbon components. e.g. cellulose or lignin. Carbon black is para-crystalline and has a high surface-area-to-volume ratio, albeit lower than that of activated carbon. It is dissimilar to soot in its much higher surface-area-to-volume ratio and significantly lower (negligible and non-bioavailable) polycyclic aromatic hydrocarbon (PAH) content.

In an optional embodiment the further type of electronically conductive particles (i.2) is carbon black and/or conductive pyrolized plant carbon components, optionally pyrolyzed cellulose or lignin, having a size, i.e. a maximum diameter, of 10 to 100 nm, optionally 20 to 60, optionally of about 40 nm.

The graphite flakes and further electronically conductive particles together form the dispersed electrically conductive particles (i) of the gel composition and are stably statistically distributed, optionally colloidally distributed in the gel composition, i.e. forming a dispersion in the dissolved binder over time and at least under ambient conditions.

The second essential component of the gel composition of the present invention is a dissolved binder based on or consisting of shellac. The term “shellac” as used herein refers to a natural biopolymer resin secreted by the female lac bug on trees in India and Thailand. Typically, it is processed and sold as dry flakes or optionally dissolved in alcohol to make liquid shellac. Shellac has utility as a tough natural primer, sanding sealant, brush-on colorant, food glaze, wood finish, tannin-blocker, odour-blocker, stain and high-gloss varnish. It is naturally adhesive. Mild hydrolysis of shellac gives a complex mix of aliphatic and alicyclic hydroxy acids and their polymers that varies in exact composition depending upon the source of the shellac and the harvest season. The major part of the aliphatic component is aleuritic acid, whereas the main alicyclic component is shellolic acid. Shellac possesses good electrical insulation qualities and seals out moisture. Shellac naturally contains a small amount of wax, about 3 to 5 vol-%. In some shellac-based preparations, e.g. “dewaxed shellac”, this wax is removed.

The binder based on or consisting of shellac for use in the gel composition of the invention can be suitably dissolved in a wide variety of chemically different solvents or solvent mixtures. However, for preparing the shear-thinning gel composition and for use in the preparation of dry printed products it is optionally dissolved in at least one solvent or a mixture of solvents having a vapor pressure between about 1 Pa and 6 kPa, optionally between about 200 Pa and 3 kPa, optionally about 200 Pa.

In optional embodiments of the invention the at least one solvent for dissolving the shellac (based) binder is selected from the group consisting of acetic acid, benzyl alcohol, n-butylalcohol, ethanol, ethylene glycol mono butyl ether, 2-butoxyethanol, ethylene glycol mono propyl ether, methanol, 1-pentanol, iso-propanol, n-propanol, tetrahydrofurane, optionally the group consisting of iso-butylalcohol, 1,4-butylene glycol, cyclohexanone, 1,4-dioxan, methylethylketone, 1,2-propylene glycol and a combination of a fast and a slow vaporizing solvent, optionally a combination of a fast and a slow vaporizing solvent with a difference in boiling points of at least 20, 30 or 40° C. (at standard conditions), optionally a combination of ethanol and pentanol, optionally in a ratio of about 10 to 0.1, optionally in a ratio of about 1 to 0.5.

The gel composition of the present invention may comprise further components that do not disrupt its shear-thinning, gel-forming, conductive and other desirable properties. For example, the gel composition may further comprise one or more components, optionally selected from color agent, plasticizer, dispersant, thickener, film forming agent, reducing agent, crosslinking agent, photoinitiator, and thermal initiator. Optionally, the plasticiser is a non-toxic plasticiser selected from the group consisting of waxes, fatty oils, oleoresin and polyethylene glycol, optionally PEG400.

The improved properties of the gel compositions of the present invention reflect the

- ratio of the electrically conductive particles of (i) and the dissolved shellac or shellac-based binder of (ii), these components being present in a ratio (i) to (ii) of about 0.1 to 2, optionally about 0.25 to 1.2, optionally about 0.5 by weight particles (i) to dissolved binder (ii); and
- the electrically conductive particles in a proportion of about 5 to 60, optionally 10 to 40, optionally around 33 parts by weight of the composition.

Optionally, the solid content of the gel composition is about 10 to 80, optionally about 30 to 70, optionally about 58.5 parts by weight.

In one alternative for practicing the present invention, the gel composition is one wherein (a) the graphite flakes (i.1) have a length of about 1 to 100 μm, optionally about 1 to 20 μm, optionally about 7 μm, and/or a thickness of 20 nm to 220 nm, optionally about 150 to 220, optionally about 200 nm; and/or (b) the at least one further type(s) of electronically conductive particles (i.2) has fibril, flake or round geometries with a size of about 10 to 100 nm, optionally about 20 to 60, optionally about 40 nm, and/or a length of about 100 nm to 200 μm.

The gel compositions of the present invention are particularly useful for preparing, optionally ink-jet printing or robocasting 2D or 3D print products, in particular for preparing electronic devices.

In one embodiment the gel composition of the present invention has at least one or more, optionally all of the following properties:

(a.) about $10^8$ to $10^2$, optionally $10^6$ to $10^4$, optionally about $10^5$ Pa storage modulus, (b.) about $10^2$ to $10^1$ Pa, optionally $10^5$ to $10^3$, optionally about $10^4$ Pa loss modulus, (c) about 1 to $10^5$, optionally 10 to $10^4$, optionally about 100 MPa apparent yield stress.

When processed, for example, by 2D or 3D ink-jet printing or robocasting for producing 2D or 3D print products, e.g. for preparing electronic devices, the gel compositions of the present invention consequently form dried, dimensionally stable, solid compositions lacking the solvent component and essentially free of any cracks. Therefore, in a further aspect, the present invention is also directed to a dried composition resulting from the gel composition of the present invention after solvent evaporation, optionally comprising graphite flakes (i.1) and at least one further type of electronically conductive particles (i.2) forming about 10 to 90, optionally about 50 to 70, optionally about 63 parts by weight of the solid composition, and optionally having an electric conductivity of at least 1 to 10'000 optionally 100 to 1'000, optionally about 200 S/m.

In principle, the gel compositions of the present invention can be prepared by any methods that homogeneously and colloidally disperse the (i.1) graphite flakes and the (i.2) at least one further type of electronically conductive particles, i.e. carbon black and/or conductive pyrolyzed plant carbon components in the appropriately dissolved binder, the solvent being capable of binder dissolution and having a vapor pressure between 1 Pa and 6 kPa, optionally between 200 Pa and 3 kPa, optionally about 200 Pa.

In one embodiment the gel composition of the present invention can be prepared by a method comprising the steps of (a) dissolving a binder based on or consisting of shellac in at least one solvent having a vapor pressure between 1 Pa and 6 kPa, optionally between 200 Pa and 3 kPa, optionally about 200 Pa, optionally adding at least one additional solvent as defined herein;
(b) dispersing electrically conductive particles comprising (i.1) graphite flakes and (i.2) at least one further type of electronically conductive particles selected from the group consisting of carbon black and conductive pyrolyzed plant carbon components, optionally pyrolyzed cellulose or lignin, in a ratio (i.1) to (i.2) of about of about 8 to 1 to about 1 to 4, optionally about 6 to 1 to about 1 to 2, optionally about 4 to 1 parts by weight graphite flakes to the further carbon component(s), in the dissolved binder of (a), optionally by high energy ball-milling, optionally leading to a minimum particle size from about 4 to about 26 nm in diameter; and
(c) optionally adjusting the rheology, optionally to at least one or more, optionally all of the rheology properties a. to c. above, i.e. (a.) about $10^8$ to $10^2$, optionally $10^6$ to $10^4$, optionally about $10^5$ Pa storage modulus, (b.) about $10^7$ to $10^1$, optionally $10^5$ to $10^3$, optionally about $10^4$ Pa loss modulus, and/or (c) about 1 to $10^5$, optionally 10 to $10^4$, optionally about 100 MPa apparent yield stress, by adding at least one solvent as defined herein, optionally by high energy ball-milling, optionally leading to a minimum particle size from about 4 to about 26 nm in diameter.

In an alternative embodiment the gel composition of the present invention can be prepared by a method comprising the steps of (a) dissolving a binder based on or consisting of shellac in at least one solvent having a vapor pressure between 1 Pa and 6 kPa, optionally between 200 Pa and 3 kPa, optionally about 200 Pa, optionally adding at least one additional solvent as defined herein;
(b) dispersing the electronically conductive particles i.2 selected from the group consisting of carbon black and conductive pyrolyzed plant carbon components, optionally pyrolyzed cellulose or lignin, in at least one solvent as defined herein, optionally by high energy ball-milling, optionally leading to a minimum particle size from about 4 to about 26 nm in diameter, and/or by high-energy sonication (ultrasonification);
(c) mixing dispersion (b) in solution (a), optionally by high energy ball-milling, optionally leading to a minimum particle size from about 4 to about 26 nm in diameter, and/or by high-energy sonication (ultrasonification); and
(d) dispersing the graphite flakes i.1 in solution (c), optionally by high-energy ball-milling, optionally leading to a minimum particle size from about 4 to about 26 nm in diameter, in a ratio (i.1) to (i.2) of about of about 8 to 1 to about 1 to 4, optionally about 6 to 1 to about 1 to 2, optionally about 4 to 1 parts by weight graphite flakes to the further carbon component(s), optionally by high energy ball-milling, optionally leading to a minimum particle size from about 4 to about 26 nm in diameter.

Optionally, the gel compositions resulting from the above method have at least one or more, optionally all of the rheology properties a. to c., i.e. (a.) about $10^8$ to $10^2$, optionally $10^6$ to $10^4$, optionally about $10^5$ Pa storage modulus, (b.) about $10^7$ to $10^1$, optionally $10^5$ to $10^3$, optionally about $10^4$ Pa storage modulus loss, and/or (c) about 1 to $10^5$, optionally 10 to $10^4$, optionally around 100 MPa apparent yield stress.

In another alternative embodiment the gel composition of the present invention can be prepared by a method comprising the steps of (a) dissolving a binder based on or consisting of shellac in at least one solvent having a vapor pressure between 1 Pa and 6 kPa, optionally between 200 Pa and 3 kPa, optionally about 200 Pa, optionally adding at least one additional solvent as defined herein;
(b) dispersing the electronically conductive particles i.2 selected from the group consisting of carbon black and conductive pyrolyzed plant carbon components, optionally pyrolyzed cellulose or lignin, in the dissolved binder of (a), optionally by high energy sonication (ultrasonification) and/or high-energy ball-milling, optionally leading to a minimum particle size from about 4 to about 26 nm in diameter;
(c) dispersing the graphite flakes i.1 in solution (b), optionally by high energy sonication (ultrasonification), and/or by high-energy ball-milling, optionally leading to a minimum particle size from about 4 to about 26 nm in diameter;
(d) optionally adjusting the rheology, optionally to at least one or more, optionally all of the rheology properties a. to c., i.e. (a.) about $10^8$ to $10^2$, optionally $10^6$ to $10^4$, optionally about $10^5$ Pa storage modulus, (b.) about $10^7$ to $10^1$, optionally $10^5$ to $10^3$, optionally about $10^4$ Pa storage modulus loss, and/or (c) about 1 to $10^5$, optionally 10 to $10^4$, optionally about 100 MPa apparent yield stress, by adding at least one solvent as defined herein, optionally by high energy ball-milling, optionally leading to a minimum particle size from about 4 to about 26 nm in diameter.

Optionally, the methods for preparing gel compositions of the present invention may further comprise a step wherein the at least one solvent(s) is removed by vaporization, optionally at ambient temperature, optionally about 40 to 80, optionally at about 60° C., thus preparing a dried composition of the present invention, e.g. when ink-jet printing or robocasting 2D or 3D print products.

The gel compositions and subsequently dried compositions of the present invention can be used as inks, optionally for preparing, optionally ink-jet printing or robocasting, 2D or 3D print products, optionally electrically conductive 2D and 3D print products, optionally products selected from the group consisting of 3D inks, electronic devices, optionally flexible electronic devices, biosensors, logic and memory devices, supercapacitors, batteries, optionally flexible batteries, capacitive sensors, RFID tags, and smart packaging.

The gel compositions of the present invention demonstrate excellent properties for robocasting, in particular electronic devices, for example environmentally sustainable IOT devices. In a further aspect the present invention concerns a method for robocasting electronically conductive products, wherein the composition of the invention is robocasted line-by-line and layer-by-layer onto a substrate of interest.

In the following the invention is illustrated by representative examples and figures, none of which are to be interpreted as limiting the scope of the invention beyond the appended claims.

FIGURES

FIG. 1 is a schematic illustration of the steps, processes and overall concept for producing a shear-thinning, dry water stable and electrically conductive gel-ink. In the gel-ink, graphite flakes provide the electrically conductive percolating network. Pure graphite reaches a conductivity of as high as $3*10^5$ S $m^{-1}$ along the $sp^2$-polarized carbon sheet (i.e. along the basal plane). However, the conductivity is three order of magnitude lower between the sheets, greatly affecting the electrons transport through the network. The effect of anisotropic electrical conductivity in graphite flake networks has been minimized here by using two carbon morphologies: graphite particles as high-conductivity mediator and amorphous carbon particles as percolating and interfaces network linker. The network created by graphite and carbon enables to reach high electrical conductivity at low conductive particle content. By dissolving, dispersing and adjusting the rheology of shellac resin-carbon composites, shear-thinning gels were been obtained, robocasted and used as current collectors for energy storage technologies.

In the following examples relating to FIGS. 2 to 8, variations of the gel-inks with different carbons, graphite flakes, shellacs, solvents and components ratios are disclosed. The starting components are carbon black, graphite flakes, shellac and pentanol. The carbon-black was purchased from Kentjentblack, Japan, and consists of 50 nm spherical particles. The graphite flakes were purchased from Sigma-Aldrich, Switzerland, and consist of 7-10 μm flakes (i.e. in length). The shellac was purchased from Kremer-Pigmente, Germany, and consist of an un-bleached and un-dewaxed orange shellac. Last, the pentanol was purchased from VWR Switzerland. Variations and modifications of components will be further noted.

Each gel-ink was prepared following an identical procedure. First, the shellac was dissolved in pentanol for 1 hour at 90° C. with a magnetic stirrer. The electrically conductive particles were dispersed with the dissolved binder with a speedmixer DAC 600.2 VAC-P from SpeedMixer, Germany, with one ball per 3 g of inks for 1 min at 2350 rpm. The rheology was adjusted by adding solvent whenever needed to reach the desired viscosity ranges.

The electrical conductivity was measured by stencil printing the gel-inks on glass substrates with a PET mask. Three samples of 8 cm by 8 mm, 8 cm by 4 mm and 8 cm by 2 mm were printed for each gel-inks. The printed samples were dried for 12 h in an oven at 60° C. and measured with a two-probes multi-meter. An MCR 302 rheometer from Anton Paar, Switzerland, was used with a plate-plate geometry with 1 mm gap and 15 mm plate diameter to investigate the rheology. Viscosity curves were obtained with a sweep of the shear rate from 0.01 $s^{-1}$ to 100 $s^{-1}$ sampled 4 times per decade. The oscillatory measurements were carried out at 1 Hz, from 0.1 to 1000% deformation sampled at 8 points per decade.

FIG. 2A shows the electrical conductivity of dried gel-inks as a function of the ratio between graphite flakes to carbon black particles by weight. The amount of dissolved shellac is constant in all the gel-inks. The highest conductivity is obtained at a ratio of three, where the electrical conductivity is dominated by the electron transport at the interface of the graphite flakes and the carbon particles. At ratios lower than 0.5, printed structures are prompt to cracking when the solvent is evaporating quickly. Whereas at ratios higher than six, the electrical conductivity is dominated by the electron transport at the interface of the graphite flakes as the electrical conductivity slowly increase between ratios 5 and 6.

FIG. 2B shows the viscosity as a function of the shear rates of gel-inks with ratios between graphite flakes to carbon black particles of 0.5, 1, 4 and 6 by weight. All gel-inks exhibit a shear thinning behavior. The viscosity is dominated by the interaction of the solvent with the surface of the electrically conductive particles. The carbon-black particles have a greater influence on the viscosity compared to graphite particles due to their higher surface area.

FIG. 2C shows the electrical conductivity as a function of the solid content of the gel-inks in the bottom x-axis and as a function of the ratio between conductive particles and dissolved shellac by weight in the top x-axis. The ratio between shellac and conductive particles is constant in all the gel-inks. High solvent content leads to more conductive particles—solvent interaction and, thus, to enhanced graphite oxidation which decrease the electrical conductivity.

FIG. 2D shows the viscosity as a function of the shear rates of gel-inks with a solid content of 69%, 52%, 39% and 36%. All gel-inks exhibit a shear thinning behavior. The higher the solid content the higher the viscosity.

FIG. 2E shows the electrical conductivity as a function of the electrically conductive particles content in the gel-inks by weight. High content of conductive particles leads to more interfaced particles and higher electrical conductivity, with a percolating limit at 20 wt %.

FIG. 2F shows the viscosity as a function of the shear rates of gel-inks with an electrically conductive particles content of 22%, 29% and 45% by weight. All gel-inks exhibit a shear thinning behavior. The dissolved shellac resin does not dominate the rheology. The higher the electrically conductive particles content in gel-ink the higher the viscosity.

FIG. 3A shows oscillatory measurement of gel-inks with ratios between graphite flakes to carbon black particles of 1, 4 and 6% by weight. The ratio of carbon black and dissolved shellac resin is constant in the three gels while the graphite flakes content is increased respectively. The yield shear stress is 600 Pa for the three gel-inks and purely dominated by the carbon-black particles.

FIG. 3B shows oscillatory measurement of gel-inks with a solid content of 69%, 52%, 39% and 36%. The gel-inks exhibit a yield shear stress of 3500 Pa, 530 Pa, 170 Pa and 3 Pa respectively. The higher the solid content the greater the yield shear stress.

FIG. 3C shows oscillatory measurement of gel-inks with an electrically conductive particles content of 22%, 29% and 45% by weight. The gel-inks exhibit a yield shear stress of 200 Pa, 600 Pa and 7300 Pa respectively. The dissolved shellac resin does not dominate the rheology. The higher the electrically conductive particles content in the gel-inks the higher the yield shear stress.

Figure 1:
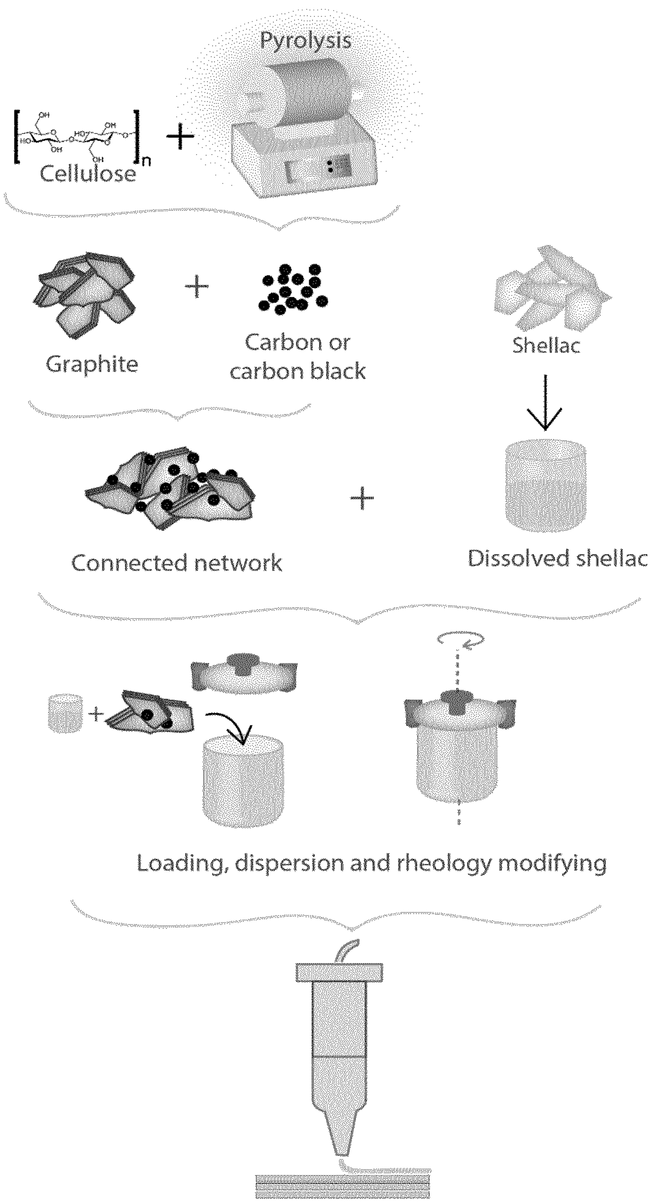
Figure 2A:
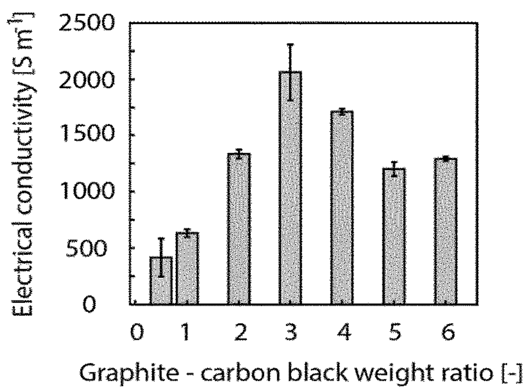
Figure 2B:
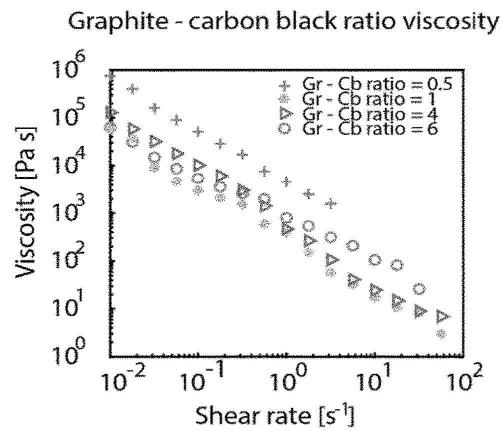
Figure 2C:
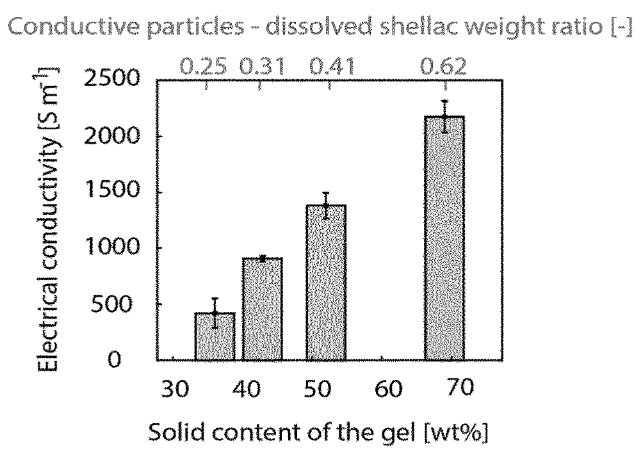
Figure 2D:
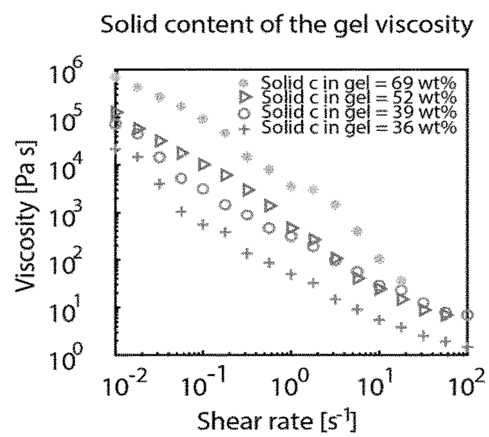
Figure 2E:
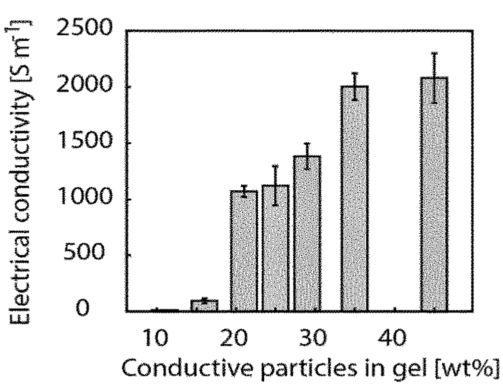
Figure 2F:
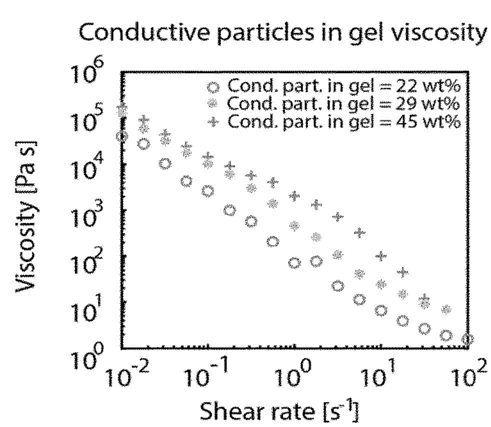
Figure 3A:
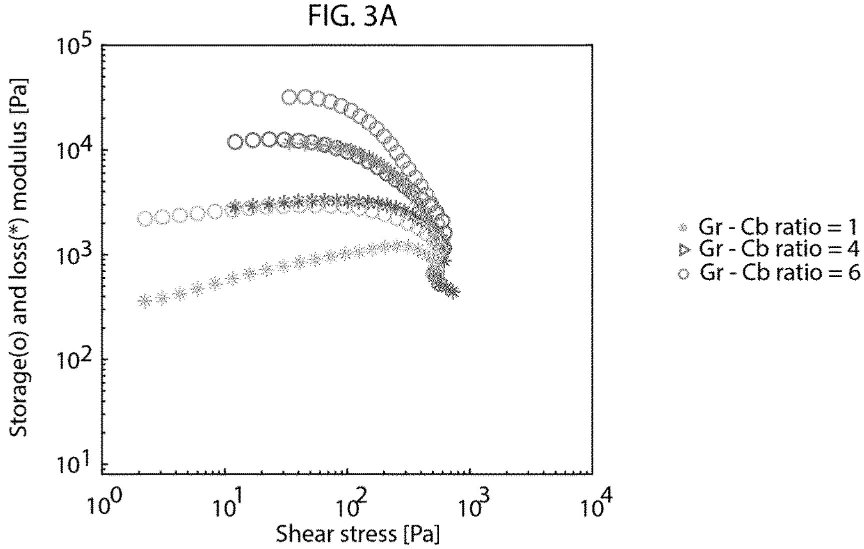
Figure 3B:
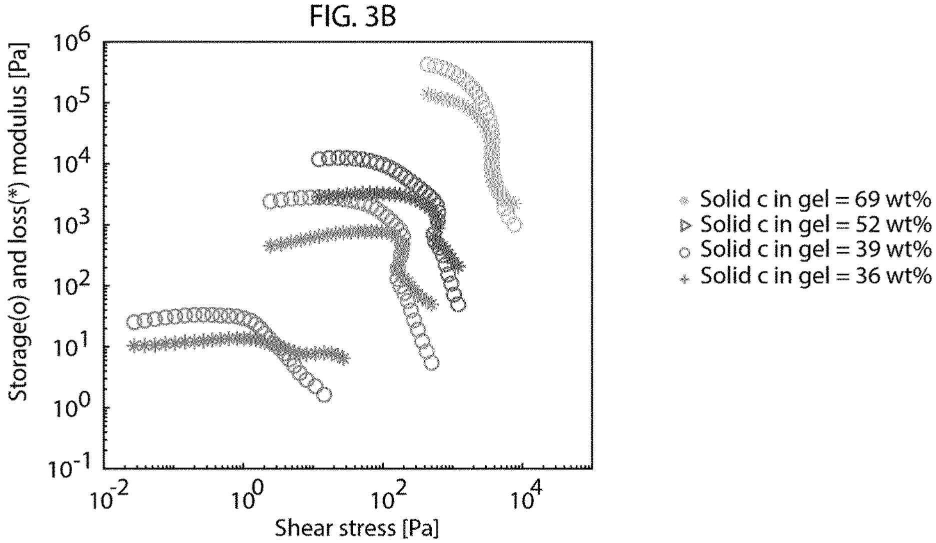
Figure 3C:
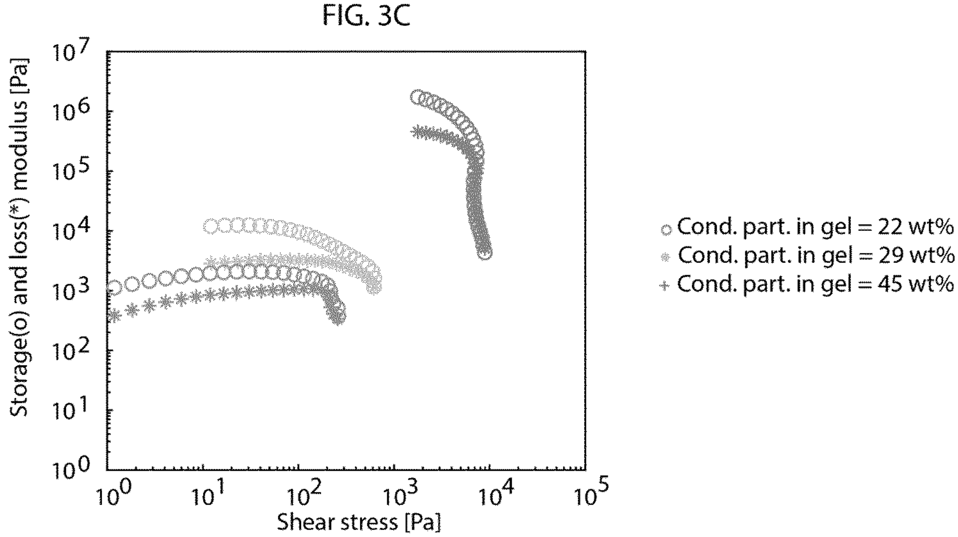
Figure 4A:
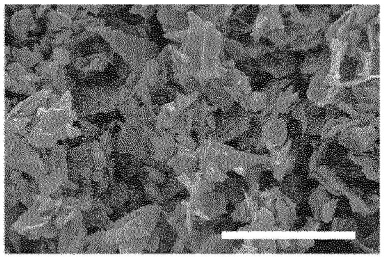
FIG. 4A shows a scanning-electron-microscopy micrograph of graphite flakes of 7-10 μm in length. Scale bar is 30 μm.
Figure 4B:
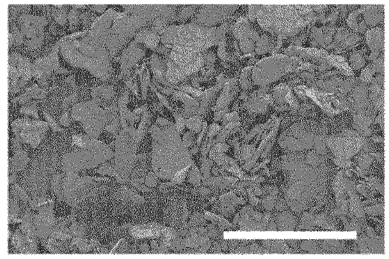
FIG. 4B shows a scanning-electron-microscopy micrograph of graphite flakes of 40 μm in length (purchased from Sigma-Aldrich, Switzerland). Scale bar is 300 μm.
Figure 4C:
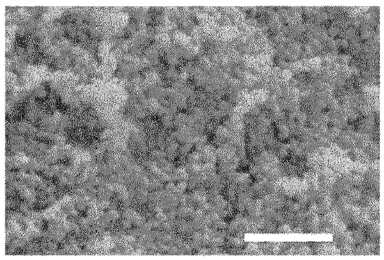
FIG. 4C shows a scanning-electron-microscopy micrograph of carbon black spherical particles of 50 nm. Scale bar is 1 μm.
Figure 4D:
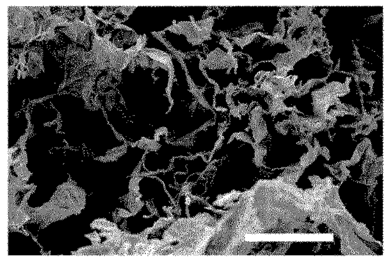
FIG. 4D shows a scanning-electron-microscopy micrograph pyrolyzed cellulose nanofibrils. Scale bar is 50 μm.
Figure 4E:
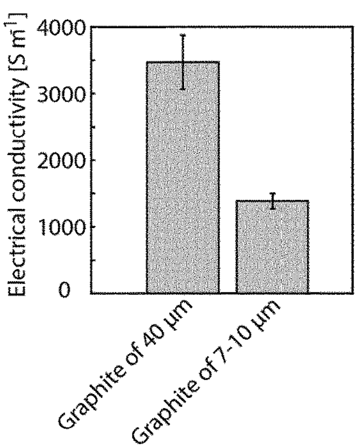

FIG. 4E shows the electrical conductivity as a function of 7-10 μm graphite flakes and 40 graphite flakes. The weight ratio of graphite to carbon-black is constant in the two gel-inks. 40 μm graphite flakes have lesser interface than 7-10 μm. The electrically conductive network is limited by the interfaces of graphite flakes with the further electrically conductive components. Thus, the electrical conductivity is higher with larger flakes.

Figure 4F:
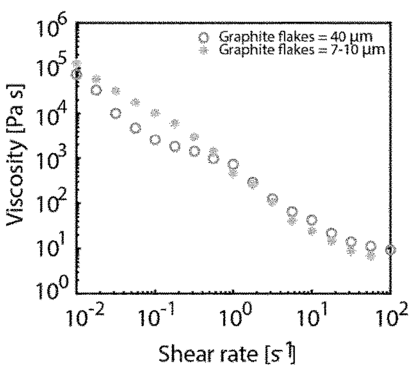

FIG. 4F shows the viscosity as a function of the shear rates of gel-inks with 40 μm and 7-10 μm graphite flakes. Both gel-inks exhibit a shear-thinning behavior. 40 μm graphite flakes have less surface area than 7-10 μm graphite flakes proportionally to their weight. Thus, 40 μm graphite flakes interact less with the solvent than 7-10 μm graphite flakes, resulting in a lower viscosity.

Figure 4G:
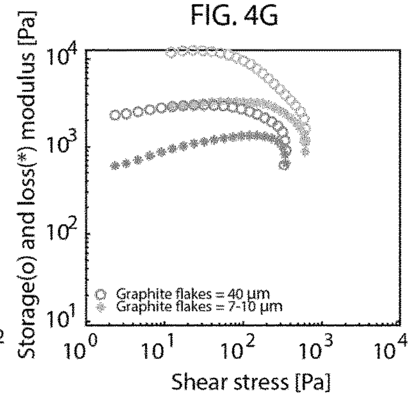

FIG. 4G shows oscillatory measurement of gel-inks with 40 μm and 7-10 μm graphite flakes. The gel-inks exhibit a yield shear stress of 300 Pa and 600 Pa, respectively. 40 μm graphite flakes have less surface area than 7-10 μm graphite flakes proportionally to their weight. Thus, 40 μm graphite flakes interact less with the solvent than 7-10 μm graphite flakes, resulting in a lower yield shear stress.

Figure 4H:
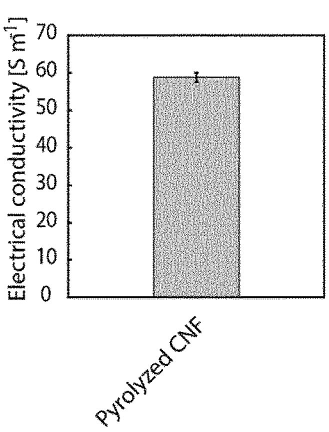

FIG. 4H shows the electrical conductivity as a function of the carbon source. The electrical conductivity is one order of magnitude lower going from 50 nm carbon black particles to pyrolyzed cellulose-nanofibrils.

Figure 4I:
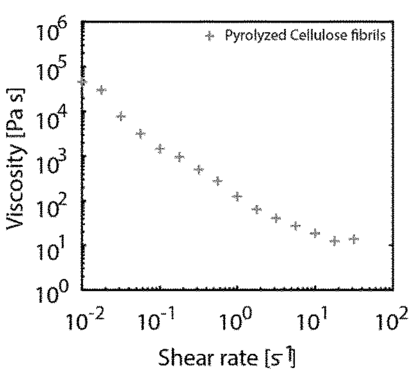

FIG. 4I shows the viscosity as a function of the shear rates of gels with pyrolyzed cellulose-nanofibrils. The gel-ink exhibits a shear-thinning behavior.

Figure 4J:
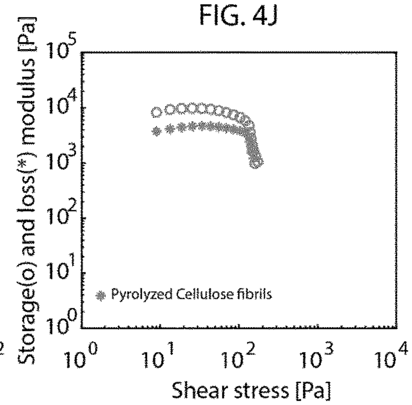

FIG. 4J shows oscillatory measurement of the gel-ink with pyrolyzed cellulose-nanofibrils. The gel-inks exhibits a yield shear stress of 150 Pa.

Figure 5A:
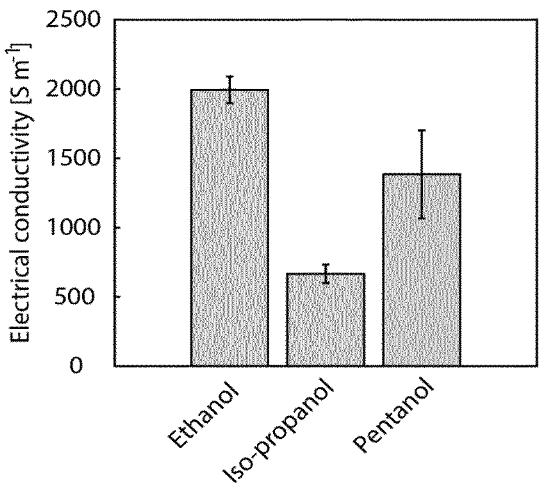

FIG. 5A shows the electrical conductivity as a function of the solvent used. The ratio of conductive particles to shellac is 1.25, the ratio of graphite-flakes to carbon black is 4 and the ratio of shellac to solvent is 0.5 in all gel-inks. Changing the solvent may affect the oxidation of the graphite flakes, which ultimately leads to variation of the electrical conductivity.

Figure 5B:
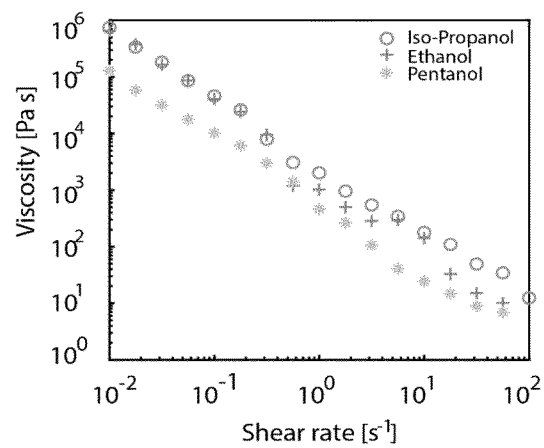

FIG. 5B shows the viscosity as a function of the shear rate of gel-inks with ethanol, iso-propanol and pentanol as solvent. All gel-inks exhibit a similar shear thinning behavior.

Figure 6A:
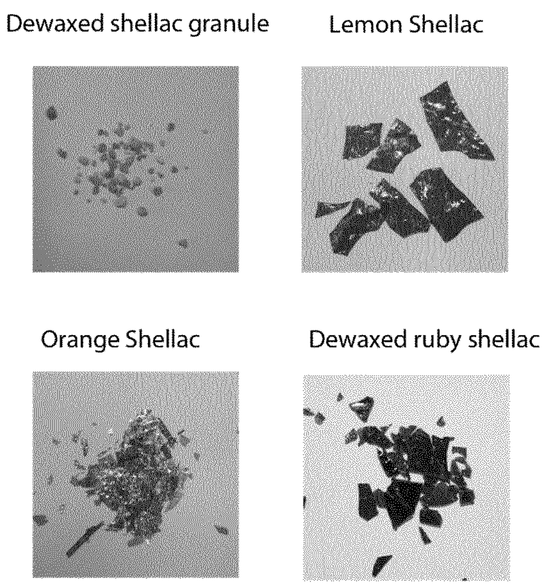

FIG. 6A shows pictures of different shellac that may be used as binder in the gel-ink.

Figure 6B:
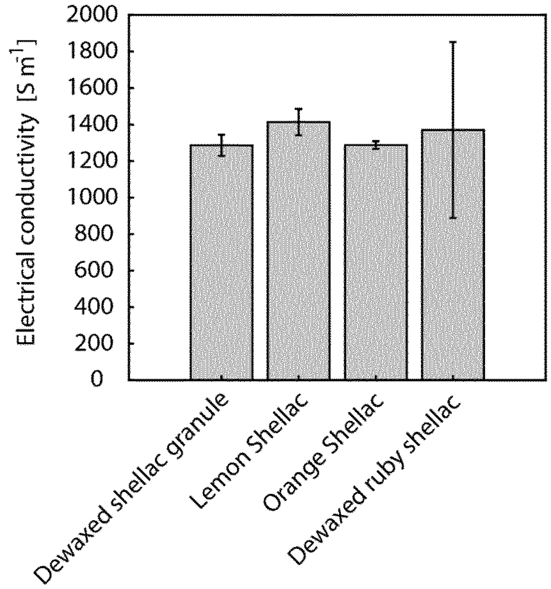

FIG. 6B shows the electrical conductivity as a function of the shellac resin. The ratio of conductive particles to shellac is 1.25, the ratio of graphite-flakes to carbon black is 4 and the ratio of shellac to pentanol is 0.5 in all gel-inks. The binder does not influence the electrical conductivity, which is only limited by the network of graphite and carbon-black.

Figure 6C:
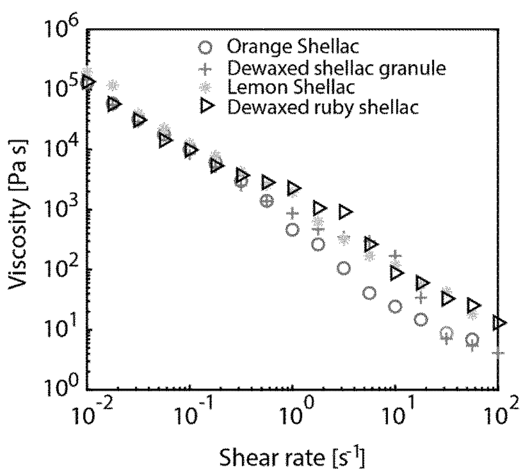

FIG. 6C shows the viscosity as a function of the shear rate of the gel-inks with dewaxed shellac granule, lemon shellac, orange shellac and dewaxed ruby shellac. All gel-inks exhibit a similar shear thinning behavior.

Figure 6D:
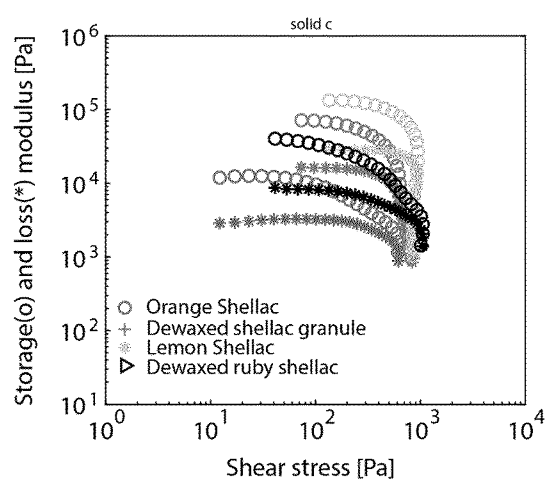

FIG. 6D shows oscillatory measurement of gel-inks with dewaxed shellac granule, lemon shellac, orange shellac and dewaxed ruby shellac. All gel-inks exhibit a similar yield shear stress of 1000 Pa.

Figure 7A:
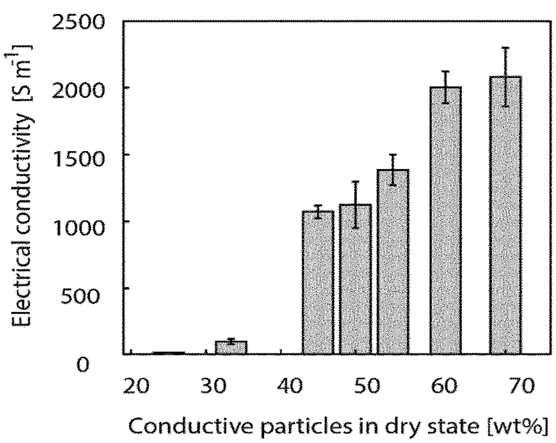

FIG. 7A shows the electrical conductivity as a function of the solid content of conductive particles in the dry gel-inks (i.e. without solvents). The ratio of graphite to carbon black is 4 in all gel-inks. The percolation of conductive particles is 35 wt %.

Figure 7B:
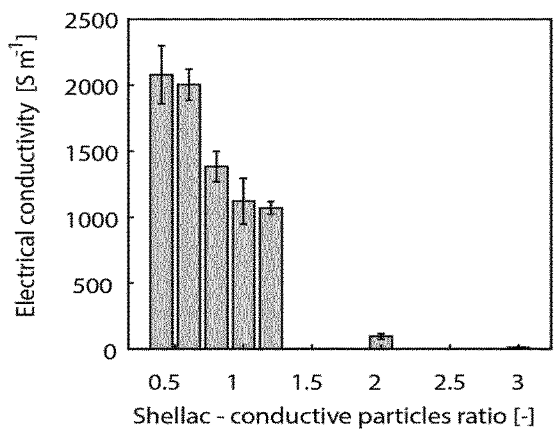

FIG. 7B shows the electrical conductivity as a function of the ratio between shellac and the conductive particles in the dry gel-inks (i.e. without solvents). The ratio of graphite to carbon black is 4 in all gel-inks. The percolation of conductive particles in shellac is at a ratio of 1.5 between the shellac and the conductive particles.

Figure 7C:
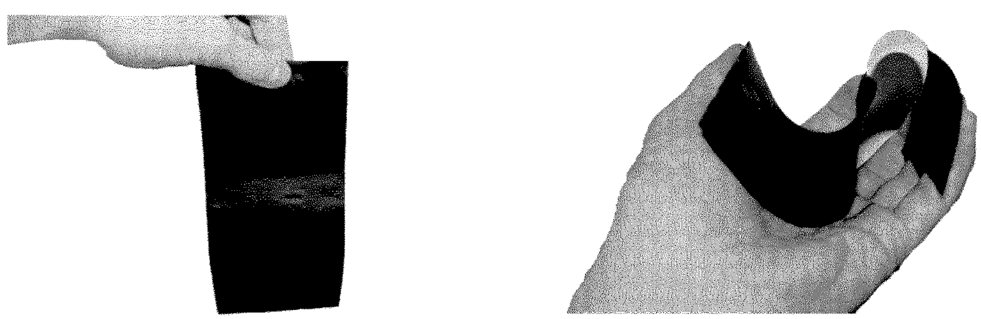

FIG. 7C shows the properties of the dry gel-ink when casted. The gel-ink was prepared following the same procedure described here-above with 6.57 wt % carbon black, 26.30 wt % 7-10 μm graphite flakes, 21.45 wt % orange shellac, 41.52 wt % pentanol and 4.15 wt % polyethylene glycol purchased from VWR Switzerland. The addition of plasticizers (i.e. polyethylene-glycol) enable the formation of flexible electrically conductive humidity stable and disposable dry sheets.

Figure 8:
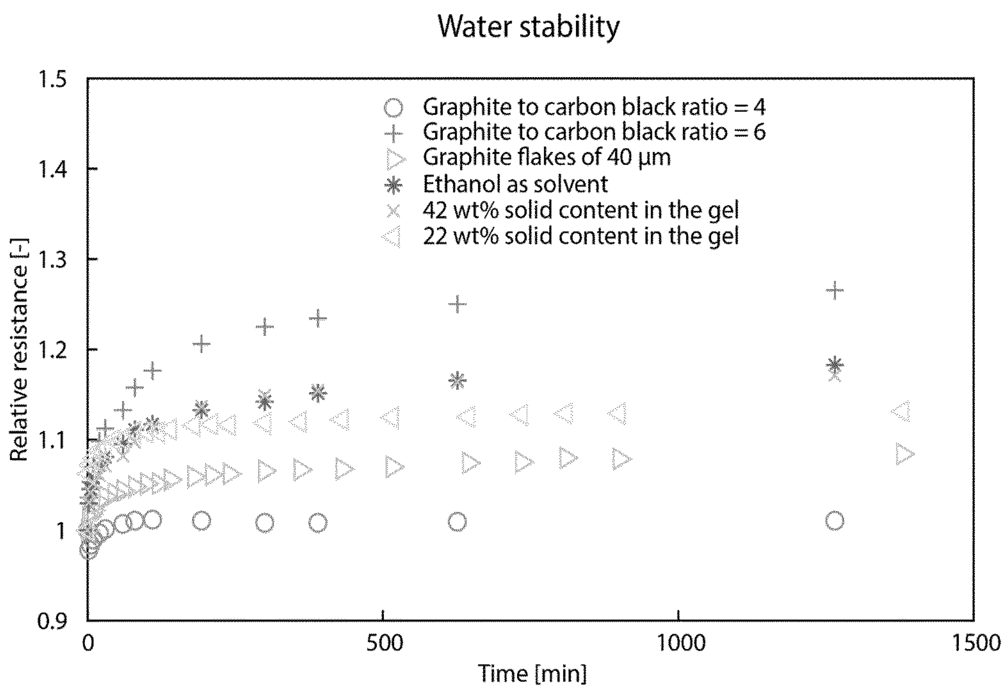

FIG. 8 shows the relative resistance of dry gel-ink as a function of the immersion time in water. The electrical resistance is stable after a transient state of 4 hours. The maximum variation of electrical resistance reaches up to 30%. Any dry gel-ink does not lose its mechanical integrity when immersed in water for more than two 48 hours.

The gel-ink can be used with 3D robocasting, as demonstrated in FIGS. 9A-E. The gel-ink used for FIG. 9A-E is composed of 22 wt % graphite flakes of 7-10 μm purchased from Sigma-Aldrich, Switzerland, 15 wt % 50 nm carbon-black P200 particles purchased from PentaCarbon, Germany, 21.5 wt % orange shellac purchased from Kremer Pigmente, Germany, 21.5 wt % ethanol and 20 wt % pentanol purchased from VWR Switzerland. All chemicals were used without purifications. To prepare the gel-ink, the shellac was dissolved in ethanol at 90° C. with a magnetic stirrer, for 25 min, with a mass ratio ethanol-shellac of ⅔. The ethanol was evaporated to reach a mass ratio of ethanol-to-shellac of one. Thereafter, the carbon black was ball-milled alone in the Pulverisette 7 from Fritsch Switzerland for 5×2 minutes at 800 rpm, with 1 min at rest between each run and one ball per gram of electrically conductive particles. Finally, the graphite, the shellac, the ethanol and the pentanol were added in the recipient and ball-milled with the same parameters. For printing, a 50 ml cartridge was filled-up with the gel-ink and centrifuged for 10 min at 3500 rpm to remove the air bubbles. The printing was performed with the 3D Bioplotter from Envisiontech Germany at 2 bar, 7.5 mm $s^{-1}$ and 20° C.

FIG. 9A shows the electrical conductivity of the printed gel-ink as a function of the direction of the printed lines. The gel-ink was printed on a glass substrate with a 400 μm printing nozzle. The electrical conductivity was measured in a 4-wire configuration and with a current of 1 mA. The results were averaged over five samples for each pattern. Conductivities of 260.8±20.1 S $m^{-1}$, 219.8±21.3 S $m^{-1}$ and 228.1±22.6 S $m^{-1}$ were measured parallel, perpendicular and at 45° to the printed lines, respectively.

FIG. 9B shows gel-ink printed in a curved substrate. The gel-ink was printed using a modified Ultimaker2+(Ultimaker, Netherland) and with a homemade g-code. It illustrates the potential of using the gel-ink to print structural and functional components with complex geometries in the same printing procedure. Scale bar is 3 cm.

FIG. 9C-D shows pictures of a 3D robocasted scaffold manufactured with the gel ink, obtained with optical microscope and SEM, respectively. The gel-ink is well suited for 3D robocasting as bridging of 1 mm can easily performed.

FIG. 9E shows pictures of 3D robocasted walls manufactured from the gel ink. From top to bottom, photography of 10, 5 and 2.5 height to width ratio walls with 16, 8 and 4 printed layers, respectively. The gel-ink sustains its own weight and complex 3D structures can be printed.

The gel-ink can be used as current collector for energy storage applications as demonstrated in FIGS. 10A-D. The supercapacitor of FIGS. 10A-D was prepared, first, by printing a nanocellulose substrate on a Kapton sheet. The substrate was then dried at 60° C. for 10 min (i.e. this can be performed directly on the printing bed). Then, one layer of electrically conductive gel-ink acting as current collectors and one layer of electrodes doped with the activated carbon EQ-AB-520Y purchased from Alibaba, China, were printed. The substrate, the current collectors and the electrodes were printed in the same procedure. The stack was then slowly dried at 25 degrees C. and 65% relative humidity for 7 days. By doing so, cracking of the electrodes was prevented and the solvent was removed entirely from the current collectors. Finally, one layer of electrolyte was printed on top of the two electrodes. As electrical connection, two wires were glued with the highly conductive gel-ink on top of the dried current collector's pads. As a last step, the device was folded and ready to be used.

Figure 10A:
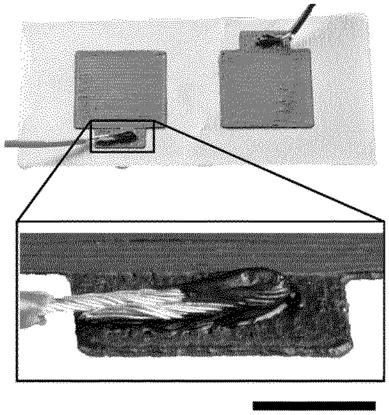

FIG. 10A is a photograph of an application of the gel-ink as current collector for disposable EDLC including a magnified view of the electrical contact obtained with the gel-ink (inset). Scale bar is 2 cm.

The device was characterized at 50% RH and 22° C. Cyclic voltammetry, chronopotentiometry and impedance spectroscopy were carried out in a 4-wire configuration, connected to the 3×5 mm current collector pads. The capacitance was determined with cyclic voltammetry using the following formula:

$$c = \frac{Q_{total}}{\Delta V} = \frac{\int_{V_{min}}^{V_{max}} i(V)dV}{2 * sr * (V_{max} - V_{min})}$$

Where, sr is the scan-rate in V $s^{-1}$, i the current, $Q_{total}$ the total charge and ΔV the potential window between $V_{max}$ and $V_{min}$. The function trapz from MATLAB is used for the numerical integration. The equivalent-series-resistance (ESR) and capacitance were determined with the chronopotentiometry using the following formulas:

$$ESR = \frac{V_{drop}}{2 * i}$$

$$c = \frac{i * \Delta t}{\Delta V}$$

Where $V_{drop}$ is the voltage drop observed when switching the polarity, i the current applied, Δt the charge or discharge time (i.e. depending on the polarity) and ΔV the voltage drop during Δt.

Finally, impedance spectroscopy and the simple double layer lumped-model were used to quantify the series resistance $R_s$, by taking the value of the real impedance when the imaginary part is equal to zero.

Figure 10B:
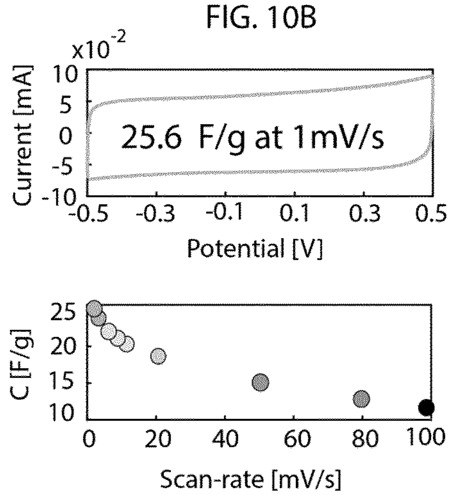

FIG. 10B shows cyclic voltammetry performed at a scan rate of 1 mV $s^{-1}$ from −0.5 to 0.5 V from which the highest capacitance is extracted (top) and the capacitance rate retention of the device (bottom). The device sustains half of its capacity at 1 mV $s^{-1}$ when the scan-rate is increased to 100 mV $s^{-1}$.

Figure 10C:
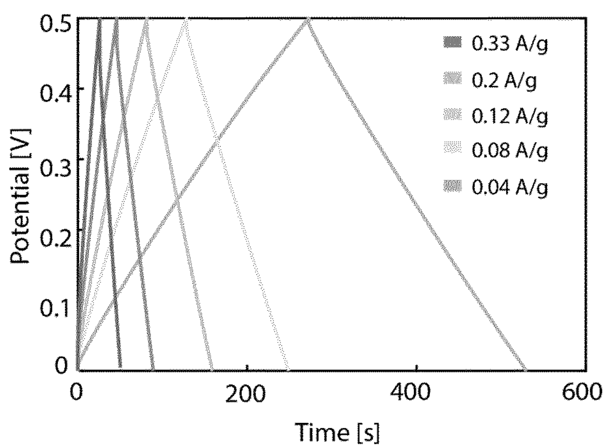

FIG. 10C shows the chronopotentiometry, with current densities ranging from 0.33 A $g^{-1}$ to 0.04 A $g^{-1}$ from 0 to 0.5 V. The device exhibits low contact resistance, indicated by the ideal triangular shape of the chronopotentiometry.

Figure 10D:
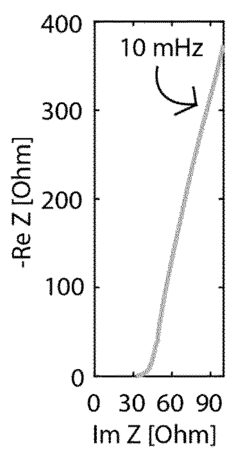

FIG. 10D shows an impedance spectroscopy performed from 0.1 Hz to 100000 Hz with at a DC bias of 0.5V and an AC bias of 0.01 V peak-top-peak. The device exhibits an ideal double layer behavior represented by the vertical shape of the Nyquist plot, with a serial resistance of 29.9Ω and limited by the high electrical conductivity of the current collectors (gel-ink).

Figure 10E:
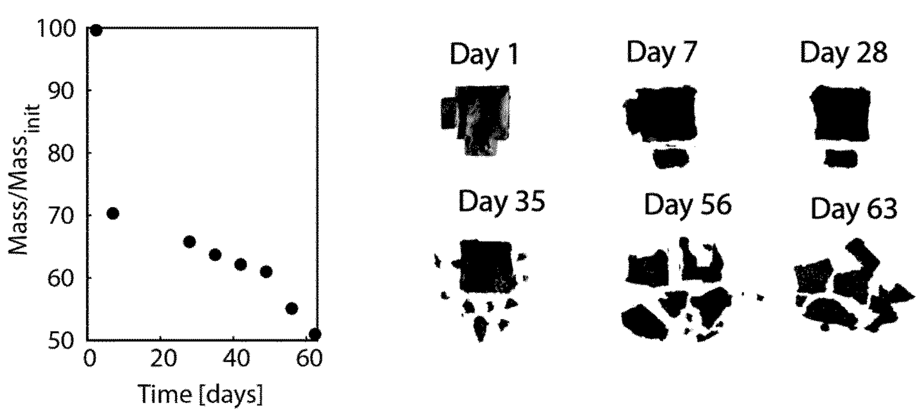

FIG. 10E shows the relative mass as a function of the time spend in a compost at 60° C. It demonstrates that the gel-ink has utility as electrically conductive material in disposable and sustainable IOT devices.

The invention claimed is:

1. A shear-thinning gel composition for producing a dry, water-stable and electronically conductive ink, comprising:
- (i) dispersed electrically conductive particles comprising
  - (i.1) graphite flakes and
  - (i.2) at least one further type of electronically conductive particles selected from the combination of carbon black and conductive pyrolyzed plant carbon components, and the combination of carbon black and pyrolyzed cellulose or lignin, in a ratio (i.1) to (i.2) of about 8 to 1 to about 1 to 4 parts by weight graphite flakes (i.1) to the further carbon component (s) (i.2);
- (ii) a dissolved binder based on or consisting of shellac dissolved in at least one solvent having a vapor pressure between 1 Pa and 6 kPa;

wherein
- the electrically conductive particles of (i) and the dissolved binder of (ii) are present in a ratio (i) to (ii) of about 0.1 to 2 by weight particles (i) to dissolved binder (ii);

and
- the electrically conductive particles are about 5 to 60 parts by weight of the composition.

2. The gel composition of claim 1, wherein the gel composition comprises a solid content of about 10 to 80 parts by weight.

3. The gel composition of claim 1, wherein the graphite flakes (i.1) have a length of 1 to 100 μm, or about 7 μm, or the graphite flakes have a thickness of 20 to 250 nm; or the further type(s) of electronically conductive particles (i.2) has a size of 10 to 100 nm.

4. The gel composition of claim 1, further comprising at least one of a color agent, plasticizer, dispersant, thickener, film forming agent, reducing agent, crosslinking agent, photoinitiator, and thermal initiator.

5. The gel composition of claim 1, further comprising a plasticiser, a selected from waxes, fatty oils, oleoresin, or polyethylene glycol.

6. The gel composition of claim 1, wherein
- (a) the graphite flakes (i.1) have a length of about 1 to 100 μm or the graphite flakes (i.1) have a thickness of 20 nm to 220 nm; or
- (b) the at least one further type of electronically conductive particles (i.2) has fibril, flake, or round geometries with a size of about 10 to 100 nm or
  the at least one further type of electronically conductive particles (i.2) have a length of about 100 nm to 200 μm.

7. The gel composition of claim 1, wherein the at least one solvent for dissolving the shellac binder is selected from the group consisting of acetic acid, benzyl alcohol, n-butylalcohol, ethanol, ethylene glycol mono butyl ether, 2-butoxyethanol, ethylene glycol mono propyl ether, methanol, 1-pentanol, iso-propanol, n-propanol, tetrahydrofurane, isobutylalcohol, 1,4-butylene glycol, cyclohexanone, 1,4-dioxan, methylethylketone, 1,2-propylene glycol, a combination of a fast and a slow vaporizing solvent, and a combination of ethanol and pentanol.

8. The gel composition of claim 1, wherein the shellac binder is selected from the group consisting of orange shellac, blonde shellac, ruby shellac, dewaxed shellac, and food-safe shellac.

9. The gel composition of claim 1, wherein the composition has at least one, two or all of the following properties:
- a. about $10^8$ to $10^2$ Pa storage modulus,
- b. about $10^7$ to $10^1$ Pa loss modulus,
- c. about 1 to $10^5$ MPa apparent yield stress.

10. A dried composition obtainable from the gel composition of claim 1 after solvent evaporation, wherein the electrically conductive particles comprising graphite flakes (i.1) and at least one further type of electronically conductive particles (i.2) form 10 to 90 parts by weight of the solid dried composition, or the electrically conductive particles have an electric conductivity of at least 1 to 10'000 S/m.

11. A method for producing the gel composition of claim 1, comprising the steps of (a) dissolving a binder based on or consisting of shellac in at least one solvent having a vapor pressure between 1 Pa and 6 kPa;

(b) dispersing electrically conductive particles comprising (i.1) graphite flakes and (i.2) at least one further type of electronically conductive particles (i.2) selected from the group consisting of the combination of carbon black and conductive pyrolized plant carbon components, or the combination of carbon black and pyrolyzed cellulose or lignin, in a ratio (i.1) to (i.2) of about 8 to 1 to about 1 to 4 by weight graphite flakes to the further carbon component(s), in the dissolved binder of (a).

* * * * *